Nov. 3, 1931.  J. G. HANSON  1,830,395

GEAR SHIFT

Filed Jan. 14, 1931  4 Sheets-Sheet 1

Inventor
John G. Hanson
By Popp & Powers
Attorneys

Nov. 3, 1931.  J. G. HANSON  1,830,395
GEAR SHIFT
Filed Jan. 14, 1931   4 Sheets-Sheet 3

Inventor
John G. Hanson
By Popp & Powers
Attorneys

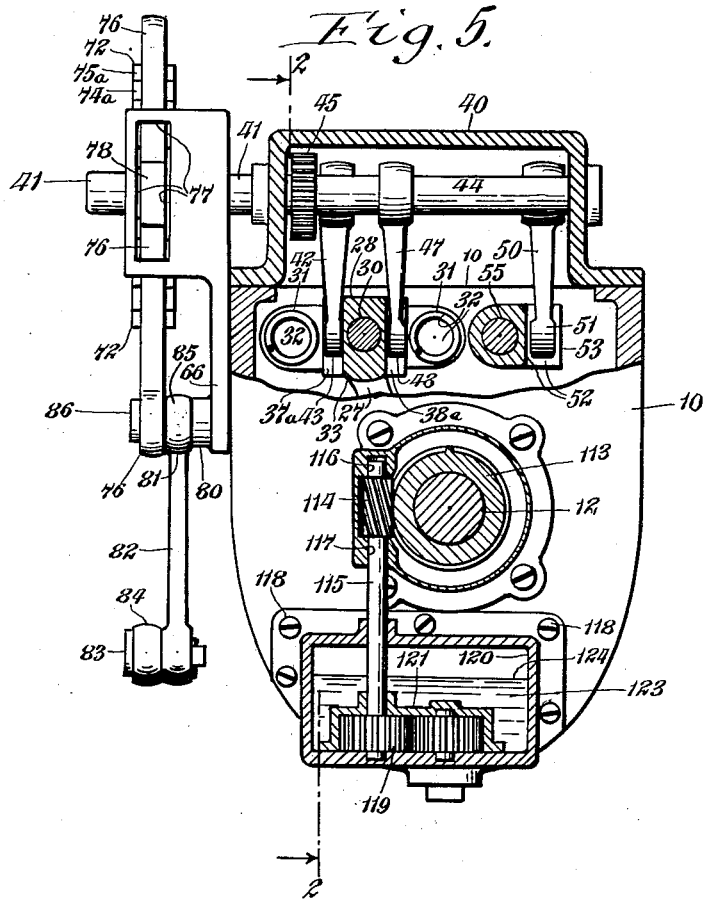

Patented Nov. 3, 1931

1,830,395

UNITED STATES PATENT OFFICE

JOHN G. HANSON, OF KENMORE, NEW YORK, ASSIGNOR TO H. & T. ENGINEERING CORPORATION, OF KENMORE, NEW YORK, A CORPORATION OF NEW YORK

GEAR SHIFT

Application filed January 14, 1931. Serial No. 508,688.

This invention relates to a gear shift for automobiles or other vehicles driven by internal combustion motors.

The object of the invention is to eliminate most of the manual operations ordinarily required in the use of a gear shift and to eliminate the usual gear shift lever which interferes with the free use, by the driver and passengers, of the front seat of the vehicle. Numerous other objects of the invention and practical solutions thereof are disclosed in detail in the herein patent specification wherein:

In the accompanying drawings:

Figure 5 is a vertical, transverse section thereof taken on line 5—5, Fig. 1.

In the following description similar characters of reference indicate like parts in the several figures of the drawings.

Figure 1:
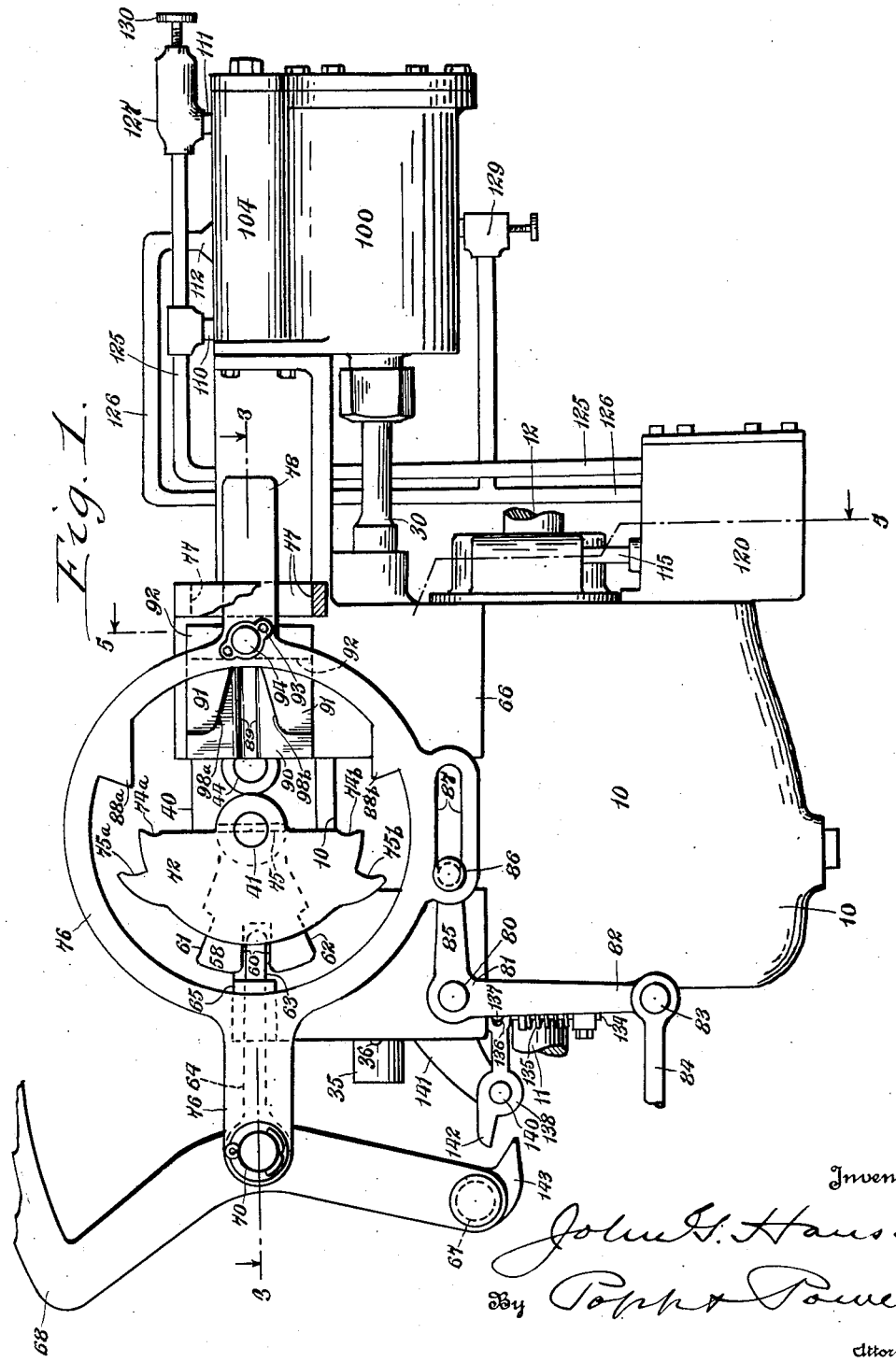
Figure 1 is a side elevation, partly in section, of the gear shift.

My invention may be embodied in various forms and in gear shifts of different constructions and the present application is therefore to be regarded merely as one organization which satisfactorily carries out the invention in practice. As here shown the same is constructed as follows:

Gear case

Mounted in any suitable manner on the chassis of an automobile or other vehicle is a gear case 10 in the forward end of which is journaled a drive shaft 11 which is connected with the usual internal combustion engine of the vehicle, through the intermediary of a friction clutch, in the usual and well known manner. Coaxially with respect to said drive shaft 11, and similarly journaled in said gear case 10, but at the rear end thereof, is a driven shaft 12 which is connected with the rear wheels of the vehicle.

The arrangement of the gears in said gear case is of conventional design and is as follows:

The rear end of said drive shaft 11 projects a short distance into said gear case 10 and has secured thereto the usual main drive gear 13. The latter meshes with and thereby drives a jack-shaft, transfer gear 14 which is secured to the forward end of a horizontal, longitudinal jack-shaft 15, journaled at its opposite ends in the lower part of the gear case 10. Secured in the usual manner to said jack-shaft 15 are three various sized transmission gears, viz: an intermediate transmission gear 16, a low transmission gear 17, and a reverse transmission gear 18, which latter is at all times in mesh with an idler, reverse gear 20 suitably journaled in the rear end of the gear case to provide a reverse direction of power flow between the drive and driven shafts. This idler, reverse gear 20 as well as the three "transmission" gears (16, 17 and 18) are caused to rotate (whenever the main drive gear 13 is rotated) by reason of the permanent meshing of said main drive gear with the jack-shaft, transfer gear 14.

The front portion of the driven shaft 12 is situated within the gear case 10 and is provided with the usual multiple splines 21, upon which are adapted to longitudinally slide the front and rear slide collars 22 and 23. The front slide collar 22 is integrally and coaxially provided with a high speed gear 24 which meshes with the usual type of direct-drive, internal gear 19 formed in the bore of the main drive gear 13, whereby, when said front slide collar 22 is moved forwardly, its high speed gear 24 enters said direct-drive, internal gear 19 and causes the driven shaft 12 to be driven by, and at the same speed as, the drive shaft 11. This is what is customarily designated as the "direct drive" between the drive shaft 11 and the driven shaft 12 and, because of its gear ratio (as compared with the lower and intermediate gear ratios), enables the vehicle to be driven at a speed which is "high" relatively to the engine speed. Said front slide collar 22 is also integrally and coaxially provided with an intermediate speed gear 25 which is adapted to mesh with aforesaid intermediate transmission gear 16 whenever the front slide collar 22 is moved rearwardly away from the position illustrated in the drawings. This provides an "intermediate", gear-ratio drive between the drive shaft 11 and the driven shaft 12.

The rear slide collar 23 is integrally and coaxially provided with only the one multiple-speed gear 26. When this gear is moved longitudinally forward by suitable actuation of said rear slide collar 23, said gear is caused to mesh with the low transmission gear 17, and when said gear 26 is moved longitudinally rearward it is caused to mesh with aforesaid idler reverse gear 20. Thus when said multiple-speed gear 26 is moved forward it provides a "low", gear-ratio drive between the drive shaft 11 and the driven shaft 12, and when it is moved rearward it provides a reverse drive between said drive shaft and said driven shaft.

Figure 4:
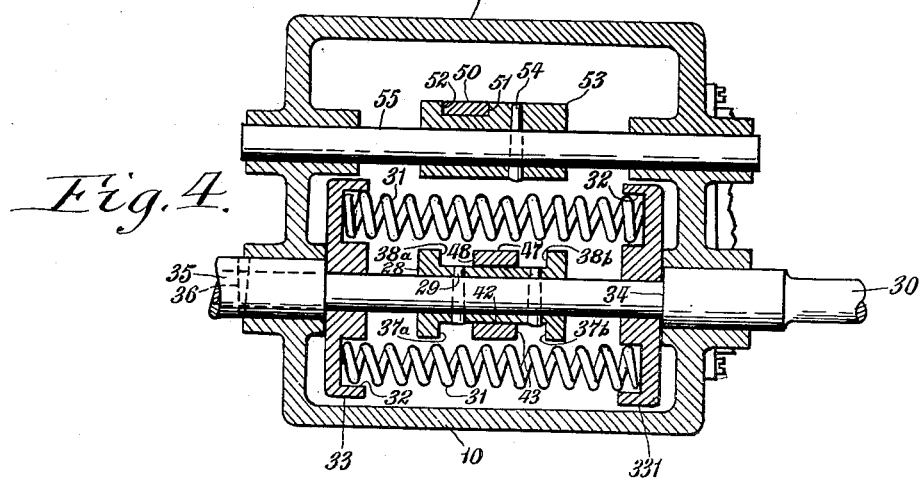
Figure 4 is a horizontal, fragmentary section thereof taken on line 4—4, Fig. 2.

The front slide collar 22 is adapted to be moved longitudinally (either forward or backward), from the position shown in the drawings, by a front shifting fork 27 which depends from and is integrally formed with a compound shift block 28 secured by taper pins 29 or otherwise to a horizontal, longitudinal piston rod 30. The latter is slidably journaled in the gear case 10 and is resiliently urged toward its middle or central position (see Fig. 4) by a pair of centralizing, compression springs 31—31 whose opposite ends are received within suitable pockets 32 formed in the inner faces of a pair of centering yokes 33 and 331. Normally the outer faces of both of said yokes bear against the inner faces of the gear case. The rear centering yoke 331 also normally bears against a shoulder 34 which is suitably formed on the piston rod 30, while the front centering yoke 33 also normally bears against the inner end of a thrust sleeve 35 which is secured to the front end of said piston rod 30 by a taper pin 36 or otherwise. By this construction the piston rod 30 is normally and resiliently centered in the position shown in the drawings. However, said rod may be forced longitudinally in either direction, and in this event either said thrust sleeve 35 or said shoulder 34 pushes its companion centering yoke 33 or 331 (as the case may be) inwardly against the resistance of said compression centering springs 31—31. Thereafter, as soon as the external force imposed upon said piston rod 30 is either removed or is sufficiently diminished, said compression springs cause said piston rod 30 to be returned or moved back to its normal or centered position.

Formed on the opposite, longitudinal faces of said compound shift block 28 are symmetrical pairs of vertical, transverse abutments 37a and 37b and 38a and 38b. Journaled horizontally and transversely in the cover 40 of the gear case 10 is a control rock shaft 41 and secured thereto is a primary rock arm 42 having an enlarged, disk-shaped head 43 at its lower end. This primary rock arm 42 extends down from said control rock shaft 41 and has its head 43 disposed in proximity to the outer face of the compound shift block 28, and is adapted to either lie centrally in the position illustrated in the drawings or to be swung either forwardly or backwardly against the abutment 37a or 37b of said shift block, as the case may be.

Journalled in the gear case cover 40, rearwardly of said control rock shaft 41, is a horizontal, transverse, secondary rock shaft 44. Secured to the latter is a secondary control gear 45 which meshes with a primary control gear 46 secured to aforesaid control rock shaft 41. Also secured to said secondary rock shaft 44 is a secondary rock arm 47 which is similar to the primary rock arm 42 and is similarly equipped with a disk-shaped head 48 which is disposed in proximity to the inner face of said compound shift block 28 and is positioned between the vertical transverse abutments 38a and 38b thereof (see Figs. 4 and 5). This arrangement provides that, if the head 43 of the primary control arm 42 is moved forward against the abutment 37a of said compound shift block 28, then the head of the secondary rock arm 47 will at the same time be moved rearward against the abutment 38b of said compound shift block. Similarly, if the head of said primary rock arm 42 is moved rearward against the abutment 37b, the head of the secondary rock arm 47 will be moved forward against the abutment 38a. In other words, a sufficient rotation of the control shaft 41 in the one or other direction will centralize the compound shift block 28 and also the piston rod 30 connected thereto, and will thereby prevent said piston rod from moving either forwardly or rearwardly away from said central position.

Depending from and secured to said control rock shaft 41 is a shift rock arm 50, the head 51 of which is rotatably and slidably received within a channel 52 whose vertical transverse walls snugly bear against the peripheral front and rear sides of said head 51. This channel 52 is formed in the vertical, longitudinal, inner face of a simple shift block 53 which is secured, by a taper pin 54 or otherwise, to a shift rod 55. The latter is horizontally and longitudinally slidably arranged in the cover 40 of the gear case, its axis being preferably in the same horizontal plane as the axis of the piston rod 30. Secured preferably integrally to and depending from said simple shift block 53 is a rear shifting fork 56 whose arms engage with a suitable annular groove formed in the aforedescribed, rear, slide collar 23 which is integrally connected with the multiple speed gear 26.

From the foregoing it is apparent that a movement of the control rock shaft 41 in the one or other direction will cause the multiple-speed gear 26 to be moved longitudinally into meshed engagement with either the low transmission gear 17 or the idler reverse gear 20 and thus couple the drive shaft 11 with the driven shaft 12 through either the low or the reverse gear train. At the same time this movement of said control rock shaft 41 in either the one or other direction operates to lock the compound shift block 28 in its central or neutral position and to thereby prevent any meshing of either the high speed gear 24 or the intermediate transmission gear 16.

Mechanical gear shift mechanism

Secured by a pin 57 or otherwise to the outboard end of the control rock shaft 41 is a locking segment 58 (see Figs. 3 and 1) which is disposed vertically and longitudinally and extends forwardly from said control rock shaft. This locking segment is provided with a radial, central, locking notch 60 and also with the radial detaining abutments 61 and 62. A lock dog 63 is adapted to be either received within said central locking notch 60 when said locking segment 58 is central, or to bear against the one or other of said radial abutments 61 and 62, whenever said shifting segment 58 has been partially rotated to the full extent of its motion in the one or other direction. This locking dog 63 constitutes the rear end or nose of a horizontal, longitudinal locking bar 64 which is slidably arranged at 65 in a guide plate 66, the latter being disposed vertically and longitudinally of the gear case and secured to the outer face thereof in any suitable manner.

Suitably journaled in the vehicle chassis in the customary and well known manner is the usual horizontal, transverse clutch-pedal rock shaft 67 which carries the conventional clutch actuating lever or pedal 68, whose upper end is adapted to be moved forwardly by the foot of the operator to release the vehicle clutch, which, as is well known in the art, is adapted to either couple the drive shaft 11 with or uncouple the same from the internal combustion motor or other source of power which is employed to propel the vehicle. The upper end of the clutch pedal 68 is resiliently urged rearwardly by means of the usual spring which forms an integral part of said clutch. In the drawings, said clutch pedal 68 is illustrated in its engaged position.

Passing horizontally and transversely through the central part of said clutch pedal 68 is a pivot pin 70 which is received within a suitable hole 71 formed in the front end of the locking bar 64. Thus, when the upper end of said clutch pedal is moved forwardly to release the clutch, said locking bar 64 is also moved forwardly, thereby moving the locking dog 63 out of engagement with said locking segment 58. While said clutch pedal 68 is in its forward or clutch-releasing position, it is possible to rotate the control rock shaft 41 in the one or other direction (to obtain either the low or reverse drive) by reason of the concomitant forward disengagement of the locking dog 63 from the locking notch 60 of the locking segment 58. Then, after said control rock shaft 41 has been either moved to one of its extreme positions or has been allowed to remain in its central position, the same is automatically retained or held in the one desired position by the rearward movement of the clutch pedal 68 and the concomitant engagement of the locking dog 63 with either the one or other of the radial locking abutments 61 or 62, or with the locking notch 60. Such locking action is, however, only effected when the clutch pedal 68 is in its rearmost position.

A shifting segment 72 is secured by a pin 73 or otherwise to the extreme outboard end of the control rock shaft 41. Said shifting segment is disposed in a manner similar to that of the locking segment 58, being disposed vertically and longitudinally and extending forwardly from the control rock shaft 41 to which it is attached. Said shifting segment 72 (see Fig. 1) is symmetrical in form and is provided with a pair of rocking notches 74a and 74b and a pair of neutralizing ears 75a and 75b.

Pivoted to the clutch pedal 68 upon its pivot pin 70 is a shifting ring 76 which is disposed longitudinally in a vertical plane and rests with its inner, flat face against the vertical, flat outer face of the guide plate 66. Said shifting ring 76 is retained at its rear end against said guide plate by the provision of a vertical guideway 77 which is formed in said guide plate 66 and receives a guiding prong 78 which is integrally formed at the rear end of said shifting ring 76. The vertical dimension or width of said guiding prong 78 is considerably less than the vertical opening of said guideway 77 which slidably receives said guiding prong. Consequently the rear end of the shifting ring 76 may be moved up or down about its floating pivot 70 on the clutch pedal 68. Such a vertical movement of said shifting ring is obtained as follows:

Pivoted at 80 to the stationary guide plate 66 is a bell crank 81 having a depending arm 82 which is pivotally connected at 83 to an actuating link 84. The latter may be actuated by the operator in any desired manner but preferably by a two-position lever mounted on the steering column of the vehicle so as to be conveniently manipulated by the driver of the vehicle. The rearwardly extending arm 85 of said bell crank is provided at its extreme end with a pivot head 86. The latter is received within an elongated slot 87 which is formed in the lower part of the shifting ring 76. The elongated shape of said slot permits said shifting ring to be moved longitudinally by the clutch pedal 68 without interference on the part of said bell crank 81. Arranged symmetrically upon the inner part of the shifting ring 76 is a pair of shifting jaws 88a and 88b.

Figure 3:
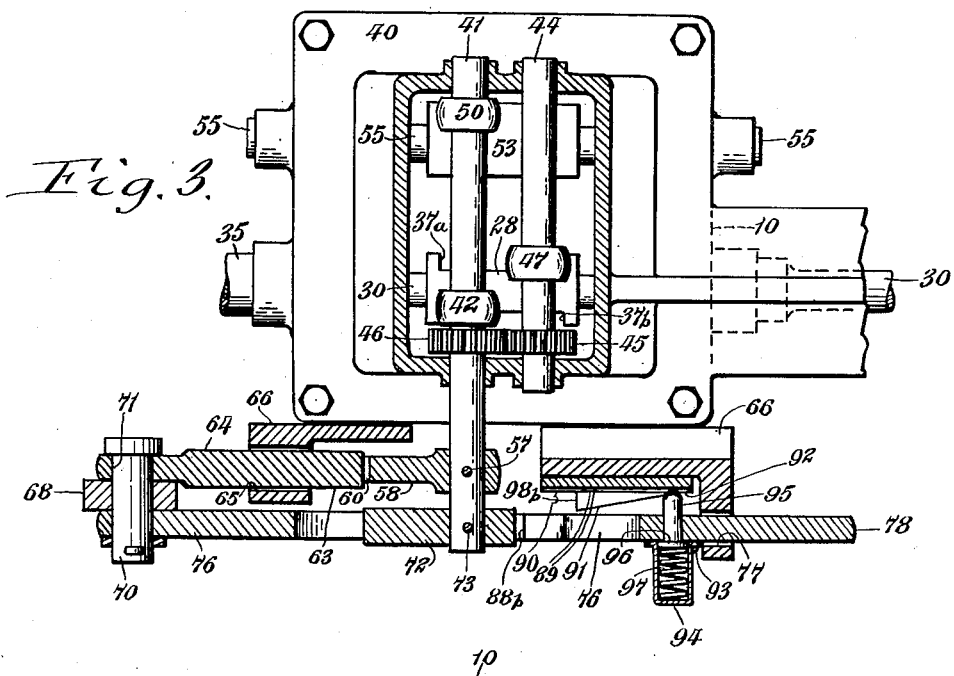
Figure 3 is a horizontal, fragmentary section thereof taken on line 3—3, Fig. 1.

Formed on the outer face of the guide plate 66 (see Figs. 1 and 3) is a horizontal, longitudinal guide groove 89 whose form is shallow and semi-cylindrical and whose axis lies in the same horizontal plane with the axis of the control rock shaft 41. Immediately above and below said guide groove 89 is a symmetrical pair of vertical, longitudinal flat faces 90, bounding which are situated a symmetrical pair of vertical, inclined faces 91, both of which lie in one vertical plane that is positioned approximately longitudinal, but slopes somewhat rearwardly and inwardly, as shown in Fig. 3. The junction of said inclined faces 91 and flat faces 90 forms a pair of symmetrical, inclined centering shoulders 98a and 98b, the former of which slopes rearwardly and downwardly and the latter of which slopes rearwardly and upwardly. The extreme rear ends of said inclined faces 91 merge into a flat, vertical, longitudinal transfer face 92 which lies in approximately the same plane as the aforementioned flat faces 90a and 90b.

Secured by rivets 93 or otherwise to the outer, vertical, longitudinal face of the shifting ring 76 is a pocket or cylindrical cup 94 whose axis is horizontal and transverse (see Figs. 3, 1 and 5). A horizontal, transverse control pin 95 is slidably journaled in said shifting ring 76 therein and is disposed coaxially with respect to the axis of its cup 94. The outer end of said control pin 95 is preferably provided with a flat, enlarged head 96, between which and the bottom of the cup 94 is interposed a compression spring 97 which resiliently urges said control pin inwardly. The inner end or nose of said control pin 95 is preferably rounded so as to conform to the semi-cylindrical shape of the guide groove 89 and also so as to be able to smoothly emerge therefrom and pass onto the flat transfer face 92 when the rear end of the shifting ring 76 is shifted vertically up or down.

From the foregoing it will be apparent that, when the bell crank 81 is partially rotated in a clockwise direction, the rear end of the shifting ring is moved down and its control pin 94 is moved laterally out of the central groove 89 and onto the flat transfer face 92. Thereupon, when the clutch pedal 68 is pushed forwardly, the locking dog 63 is disengaged from the central locking notch 60, thereby allowing the control rock shaft 41 to be free to partially rotate. This partial rotation is obtained by the forward movement of the upper shifting jaw 88a of the shifting ring 76, said jaw coming in contact with its companion rocking notch 74a of the shifting segment 72. Thereby is caused a partial rotation of the control rock shaft 41 in a counter-clockwise direction which causes the multiple-speed gear 26 to be shifting longitudinally rearward and into mesh with the idler reverse gear 20.

In the meantime, the control pin 94 has moved forwardly past the front end of the upper inclined face 91 and has dropped over the upper centering shoulder 98a onto the upper flat face 90 because of the resilient influence of the compression spring 97. Thereupon, when the clutch lever 68 is released and the shifting ring 76 caused to move rearwardly, the nose of said control pin 94 slides along said upper flat face 90 until it arrives at the upper, centering shoulder 98a which, by reason of its incline, pushes said control pin 94 downwardly into the central groove 89 while said shifting ring 76 is continuing to move rearwardly. This downward or centralizing movement of the rear end of said shifting ring 76 also operates to automatically centralize the bell crank 81.

The same general sequence of operations just described also occurs if the initial semi-rotation of said bell crank 81 is in a counter-clockwise direction, in which case also said bell crank 81 and shifting ring 76 are similarly returned to their centralized positions, i. e., to the positions illustrated in the drawings. It should be noted, however, that when said bell crank 81 is initially moved in a counter-clockwise direction, the result is a partial rotation of the control rock shaft 41 in a clockwise direction, as a consequence of which multiple-speed gear 26 is moved forward into meshed engagement with the low transmission gear 17.

In either case first mentioned, if the clutch lever 68 is subsequently moved forward without any alteration in the centralized position of the bell crank 81, then the control rock shaft 41 will be centralized by the translatory movement of the shifting jaws 88a and 88b, the one or other of which will engage with and forcefully bear against the one or other of the rocking notches 74a or 74b, and this causes a partial rotation of said control rock shaft 41 until it is in its centralized position, i. e., in the position illustrated in the drawings. In any and all cases, however, no movement of said control rock shaft 41 can take place until the clutch lever 68 has been moved sufficiently forward to disengage the locking dog 63, this being true for all three positions of said control rock shaft. This prevents accidental disengagement of the multiple-speed gear 26.

*Hydraulic gear shift mechanism*

Suitably secured to the rear end of the cover 40 of the gear case is a cylinder 100, the axis of which is horizontal and longitudinal and is coaxial with the piston rod 30. Slidably arranged in said cylinder is a piston 101 which is secured to the extreme rear end of said piston rod. Formed in the one thickened wall of said cylinder are a pair of fluid transfer ducts 102 and 103 whose inner ends open into opposite ends of said cylinder 100 and whose outer ends form suitable ports in the cylindrical bore 104 of a cylindrical slide valve 105. The latter is constantly and resiliently urged forwardly by a suitable compression spring 106.

The central peripheral portion of said slide valve 105 is annularly reduced at 107, while its extreme front peripheral end is annularly rabbeted at 108. Leading into the extreme front end of the bore 104 of said slide valve is a low pressure inlet duct 110 while leading into the rear end of said bore 104 is a high pressure inlet duct 111. The central part of said slide valve bore 104 is provided with an exhaust duct 112.

Figure 2:
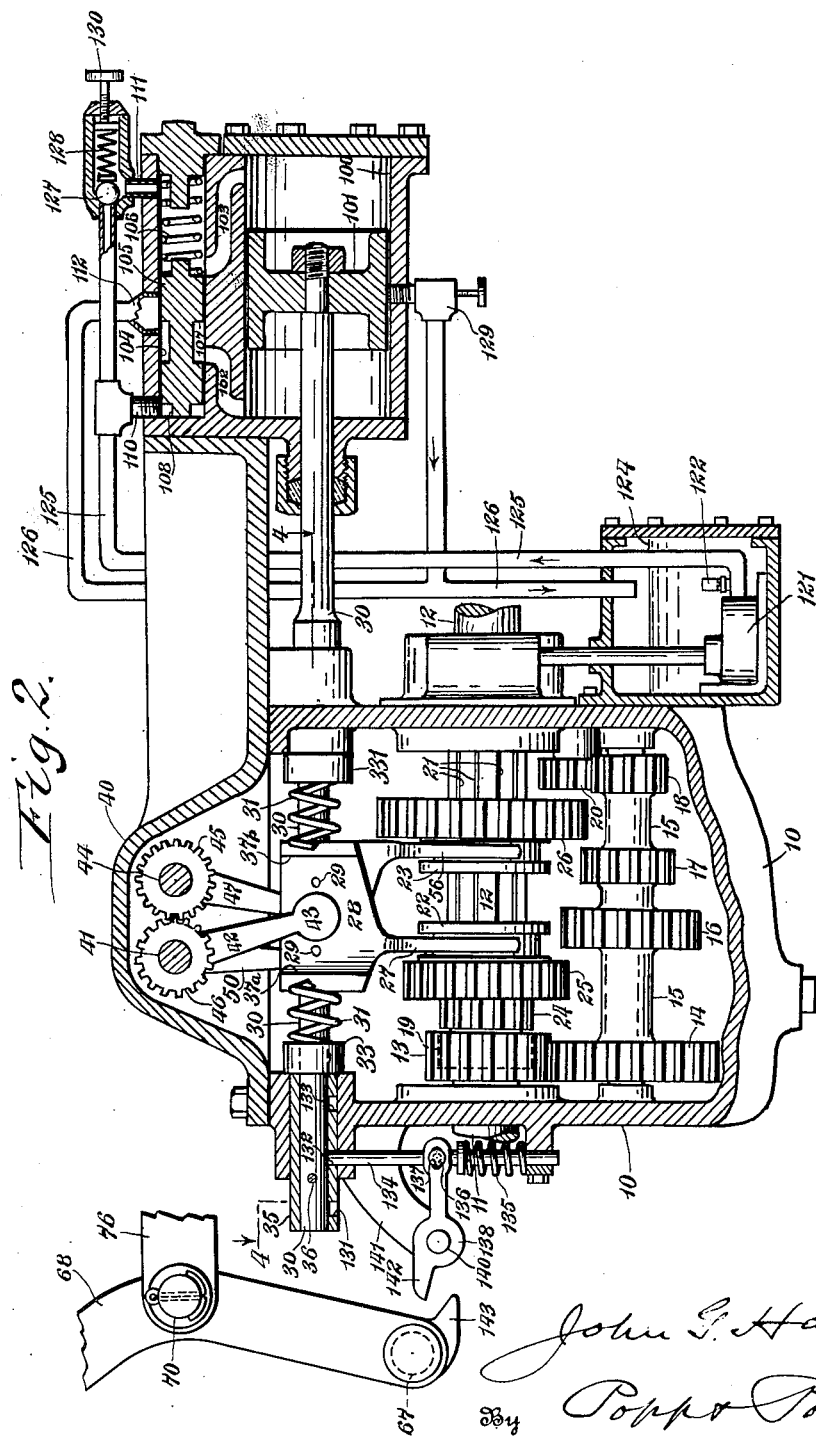
Figure 2 is a vertical, longitudinal section thereof taken on line 2—2, Fig. 5.

A worm wheel 113 (see Figs. 5 and 2) is secured to the rear end of the driven shaft 12, meshing with which is a worm gear 114 secured to the upper end of a vertical pump shaft 115 which is suitably journaled at 116 and 117 in the gear case 10. Secured by cap screws 118 or otherwise to the rear, vertical, transverse wall of said gear case is a fluid reservoir 120 and arranged in the bottom thereof is a conventional, fluid, gear pump 121, the drive gear 119 of which is secured to the lower end of aforesaid pump shaft 115 and is power driven thereby. This gear pump is provided with a conventional blow off valve 122 to prevent excessive fluid pressures from being built up. A sufficient quantity of some suitable fluid 123 (such as a glycerine-alcohol mixture) is maintained within said reservoir up to a fluid level 124 which is situated above the top of the gear pump so as to render the latter at all times self priming.

Said gear pump 121 is adapted to receive the fluid 123 from said reservoir 120 and to discharge the same under pressure into a feed pipe 125. The fluid pressure in said feed pipe is always proportional to the speed of the vehicle. This is because of the fact that the gear pump 121, which creates said pressure, is geared directly to the driven shaft 12 of the vehicle and the latter is, in the usual and well known manner, power connected to the rear wheels of the vehicle. Said feed pipe 125 is adapted to convey the fluid under pressure from said gear pump 121 to both the low and high pressure inlet ducts 110 and 111 aforedescribed, the fluid being conveyed back to the reservoir 120 from the exhaust duct 112 through an exhaust pipe 126. This exhaust pipe 126 is also adapted to receive (under certain conditions) a quota of fluid from an adjustable excess-pressure valve 129 which is tubularly connected with the central part of the cylinder 100. The flow of fluid from the feed pipe 125 into the high pressure inlet duct 111 is restrained by a spring loaded check valve 127, provided with a compression spring 128 which is rendered adjustable by the provision of a suitable spring adjusting screw 130.

Formed in the lower, peripheral face of the aforedescribed thrust sleeve 35 are three locking notches 131, 132 and 133,—any one of which is adapted to receive the upper end of a trip bar 134 which is vertically and slidably arranged at the front end of the gear box 10. This trip bar is resiliently urged upwardly by a suitable compression spring 135 and is provided with a suitable trunnion 136 which projects horizontally and transversely from opposite sides thereof. Said trunnion is received within an approximately horizontal slot 137 formed in the rear end of a trip lever 138 which is fulcrumed at 140 upon an arm 141 of the gear case. The forward arm 142 of said lever is adapted to be pressed upwardly by a trip arm 143 which is secured to and extends rearwardly from the clutch pedal rock shaft 67 and hence is actuated by movement of the clutch pedal 68.

*Operation*

In the position of the various parts as illustrated in the drawings, all of the sliding gears are out of mesh and no power is being delivered from the drive shaft 11 to the driven shaft 12. Also there is no fluid pressure being maintained by the gear pump 121 inasmuch as the latter is power driven from said driven shaft 12 which is assumed to be at this time motionless. Under these conditions also the piston rod 30 is held in its central position by the trip bar 134 and also by the centralizing springs 31, no effective resistance being caused by the piston 101 by reason of the fact that said piston is a relatively loose fit in its cylinder 100 and this looseness permits of a very minute but adequate flow of fluid past said piston from one end of the cylinder to the other, so long as no considerable pressure differential exists, as in the present case.

We will first assume that the operator desires to reverse the vehicle. His first operation to attain this end is to partially rotate the bell crank 81 in a clockwise direction to the limit of its motion in this direction. This movement is limited by the lower terminus of the vertical guideway 77 in which the guiding prong 78 of the shifting ring 76 slides. This movement causes the rear end of the shifting ring 76 to be depressed and the control pin 95 to be forced laterally out of the central guide groove 89 and onto the flat surface of the transfer face 92. The operator now "releases" or disengages the clutch of the vehicle by moving the upper end of the clutch lever 68 forward. This movement first releases the locking dog 63 (thereby permitting rotation of the control rock shaft 41) and then forces the upper shifting jaw 88a of said shifting ring into engagement with the upper rocking notch 74a of the shifting segment 72. This causes a counter-clockwise partial rotation of the control rock shaft 41 and of its shift rock arm 50 which, in turn, causes a rearward movement of the rear shifting fork 56 and of the multiple-speed gear 26. The latter is thus caused to mesh with the idler reverse gear 20 and to thus provide a reverse gear train between the drive shaft 11 and the driven shaft 12.

In the meantime, however, the trip bar 134 has been forced down. This, taken by itself, would permit the piston rod 30 to move longitudinally, and such a movement at this time is not desirable. To prevent any such occurrence (and to ensure that, at this time, said piston rod 30 will be securely retained in its central position) is the function of the secondary rock shaft 44, the gears 46 and 45 and the rock arms 42 and 47 operating as follows: The just described partial counter-clockwise rotation of the control rock shaft 41 moves the primary rock arm 42 rearwardly into contact with and against the abutment 37b of the compound shift block 28. At the same time the secondary rock shaft 44 is partially rotated in a clockwise direction through the gears 46 and 45, and the secondary rock arm 47 moved forwardly against the abutment 38a of said compound shift block 28. It makes no difference whether said compound shift block 28 is in front of or behind its central position, because, in either case, the symmetrical, scissor-like, opening movement of said rock arms 42 and 47 causes said compound shift block 28 to be positively moved to its centralized position. And inasmuch as said shift block is secured to the piston rod 30, it naturally follows that the latter is likewise forced to its central position and held in this position so long as the control rock shaft 41 is in its extreme partially rotated position.

The reverse gear train (26, 20, etc.) is now in mesh, and the piston rod 30 is in its neutral or central position causing the high speed gear 24 and the intermediate speed gear 25 to be held out of mesh. The clutch pedal 68 is, however, still "out", so that the vehicle is not yet being driven along the road. The operator now releases his normal pressure against said clutch pedal. This causes the locking dog 63 to move rearward and to bear against the upper detaining abutment 61, thereby locking the control rock shaft 41 in place and, concomitantly, locking all of the transmission gears in position. At this time also the trip bar 134 is allowed to move upwardly under the influence of its spring 135 and to again enter the central locking notch 132. At the same time, furthermore, the control pin 95 is moved rearward along the lower flat face 90 until it strikes the lower inclined, centering shoulder 98b, which deflects it upwardly, and with it the whole rear end of the shifting ring 76, until, at the completion of this rearward movement of said clutch pedal 68, said control pin 95 again drops into the centering groove 89 and it and said centering ring take the position illustrated in the drawings. This lifting of the rear end of the shifting ring 76 automatically also lifts the bell crank 81 to its neutral or central position.

The vehicle now continues to be driven in a reverse direction as long as the clutch pedal 68 is allowed to remain in this engaged or rearmost position. If now the operator desires to stop the car he may do so by pushing out the clutch pedal and applying the usual vehicle brakes. This forward movement of said clutch pedal automatically disengages the multiple-speed gear 26 from the idler, reverse gear 20. This is accomplished as follows: The first part of the forward stroke of said clutch pedal 68 unlocks the locking dog 63 and thereby permits of rotation of the control rock shaft 41. Further movement of said clutch pedal brings the upper shifting jaw 88a of the shifting ring 76 into forceful contact with the upper neutralizing ear 75a of the shifting segment 72. This causes a counter-clockwise partial rotation of said segment which movement continues until the shifting jaws 88a and 88b are both in contact with their companion neutralizing ears 75a and 75b. This causes said shifting segment 72 to be neutralized, in which position the multiple-speed gear 26 is in the position illustrated in the drawings. It will be noticed that this result has been accomplished without any other manipulation than the release of the clutch (forward movement of clutch pedal 68). It should be borne in mind that in an ordinary automobile, not only is such a clutch pedal actuation required but the ordinary gear shift lever must be moved to disengage the reverse gear.

The car has now been brought to a standstill with all of the sliding gears out of mesh, so that the operator can, if he likes, allow the clutch pedal 68 to move to its rearmost position with the engine continuing to rotate but without any power being delivered to the driven shaft 12.

We will now assume that the operator desires to drive the vehicle forward in low gear. He first moves the bell crank 81 in a counter-clockwise direction from the position shown in the drawings, thereby elevating the rear end of the shifting ring 76. He then pushes the clutch pedal 68 forward. This causes the locking dog 63 to be released and thereafter the control rock shaft 41 to be partially rotated in a clockwise direction by reason of the pushing forward of the lower rocking notch 74b by the lower shifting jaw 88b. This causes the shift rock arm 50 to slide the multiple-speed gear 26 forward into engagement with the low transmission gear 17. Despite the fact that, in this operation, the trip bar 134 has been retracted, nevertheless the piston rod 30 is forced to maintain or to be moved to a centralized position by reason of the scissor-like movement of the primary and secondary rock arms 42 and 47, just as in the case of the reverse gear drive previously described. In the instant case, the low gear ratio being in engagement, the same is maintained in mesh, when the clutch is released, by the engagement of the locking dog 63 with the upper detaining abutment 61. Then as the rock arms 42 and 47 move toward each other and thereby relinquish their duty of centering the piston rod 30, this duty is taken over by the trip bar 134 which is pushed again up into the central locking notch 132 under the influence of the compression spring 135. With the clutch pedal 68 in its retracted position, and with the engine driving the automobile forward through the low gear ratio, the operator may speed up the engine to any extent desired without affecting the meshing of said low gear ratio. This provision is necessary in that it occasionally becomes necessary (when pulling through very heavy sand or driving up a very steep hill) to race the engine in low gear and to obtain a fair rate of vehicle speed without danger of stalling the motor when traversing a particularly difficult stretch of road.

We will now assume that the vehicle is moving at a fair rate of speed in low gear and on a level, hard stretch of road, and that the operator desires to shift into intermediate gear. To do this he has only to push out the clutch pedal 68 and then allow it to return to its normal position. This semi-automatic shift from low to intermediate gear is accomplished as follows: The forward movement of the clutch pedal 68 causes the control rock shaft 41 to be centralized by the engagement of the upper shifting jaws 88a with its companion upper neutralizing ear 75a. Broadly stated, if the bell crank 81 is in its centralized position, then a forward movement of the clutch pedal 68 will centralize the control rock shaft 41, if it was not already in a centralized position. Moving said control rock shaft 41 to its central position causes the multiple speed gear 26 to be disengaged from whatever gear it was previously in mesh with, whether this be the low transmission gear 17 or the idler, reverse gear 20. In the meantime, this forward movement of said clutch pedal 68 has retracted the trip bar 134 which permits the piston rod to be moved longitudinally, such a movement not being prevented by the rock arms 42 and 47 when the control rock shaft 41 is in its central position as in the instant case.

The fluid gear pump 121 being power driven from the driven shaft 12 necessarily maintains a fluid pressure which is approximately proportional to the vehicle speed. This fluid pressure is carried up through the feed pipe 125 and flows through the low pressure inlet duct 110 into the front end of the bore 104 of the cylindrical slide valve 105. Entering the space provided by the rabbet 108 at the front end of said valve, the fluid pressure bears against said slide valve 105 and forces the same rearwardly against the tension of the spring 106 which, as regards its effectiveness, is comparatively weak. This rearward movement of said slide valve continues until the front edge thereof passes beyond the port of the fluid duct 112, whereupon said fluid flows into the front end of the cylinder 100 and forces the piston 101 therein rearwardly. Any fluid which at this time is in the rear end of said cylinder 100 is given a free vent through the fluid duct 102, thence through the annular reduction 107 of the slide valve 105 and back through exhaust pipe 126 to the fluid reservoir 120. The unit pressure exerted by the check valve spring 128 is greater than the unit pressure exerted by the cylindrical valve spring 106, when the vehicle is travelling at a moderate speed as is at present being assumed.

This rearward movement of the piston 101 also moves the piston rod 30 rearwardly and carries with it the compound shift block 28, front shifting fork 27 and intermediate speed gear 25. The latter is thus caused to mesh with the intermediate transmission gear 16. The clutch pedal 68 is now released and power from the vehicle engine allowed to flow through the driven shaft 11 and through the intermediate gear train to the driven shaft 12 and thence to the rear wheels of the vehicle. With said clutch pedal in its retracted position the control rock shaft 41 is held in its central position by the engagement of the locking dog 63 with the central locking notch 60 of the shifting segment 72. Also, with said clutch pedal 68 in its retracted position, the vehicle engine may be speeded up to any desired degree without affecting the meshing of the intermediate gear train. When the piston 101 has travelled to the extreme rear end of its travel, it uncovers the central fluid bleeding port leading to the adjustable, excess-pressure valve 129, through which excess fluid may flow back to the fluid reservoir 120.

During this rearward movement of the piston rod 30, the multiple-speed gear 26 is allowed to remain in or compelled to move to its central or neutral position by the rearward movement of the abutments 37a and 37b. The latter are adapted under these circumstances to bear rearwardly against whichever of the rock arms 42 or 47 is forward of its neutral position. This pushing rearward of either the one or the other of these rock arms 42 or 47 to its central position compels the other rock arm to move forward into neutral position by reason of the gearing 40 and 45 which connects the control rock shaft 41 and the secondary rock shaft 44, it being upon these shafts that the said rock arms are mounted. The centering of the front or primary rock arm 42 and its control rock shaft 41 causes the multiple-speed gear 26 to be likewise centered or held in its neutral position by reason of the shift arm 50, rear shifting fork 50, etc. which mechanically link said control shaft 41 with said multiple-speed gear 26.

When the vehicle has sufficiently speeded up while driving through this intermediate gear train, it will, of course, be desirable to shift into high gear. This the operator accomplishes by merely pushing forward the clutch pedal 68 and then allowing it to return to its normal or engaged position. This result is obtained as follows: The speeding up of the vehicle in intermediate gear has also speeded up the fluid pump 121 and thus also increased the fluid pressure in the feed pipe 125. This extra pressure finally becomes great enough to open the spring loaded check valve 127. This imposes an equal fluid pressure upon both ends of the cylindrical slide valve 105, and, as a consequence, the compression spring 106 is enabled to force said slide valve forwardly. This movement closes the fluid flow from the low pressure inlet duct 110 into the front fluid duct 102 and allows the fluid in feed pipe 125 to flow through the high pressure fluid duct 111 into the rear fluid duct 103 and against the rear side of the piston 101. The cylindrical valve 105 is now in the position illustrated in the drawings.

This fluid pressure exerted against the rear face of said piston is unable to alter the position of the same if, as in the present case, the piston rod 30 is being restrained against longitudinal movement by the trip bar 134. When, however, the operator disengages the vehicle clutch by pushing forwardly against the clutch pedal 68, said trip bar 134 is depressed against the resistance of its spring 135. The piston rod 30 is now free to move longitudinally forward under the influence of the fluid pressure in the rear end of the cylinder 100. This movement continues until the high speed gear 24 is in full mesh with the teeth of the internal gear 19 at which time the piston 101 is at the extreme forward end of its stroke and the excess pressure built up in the rear end of said cylinder is being allowed to vent through the excess pressure valve 129 and the fluid to flow therethrough back into the fluid reservoir 120.

Here again, as in the case of the automatic meshing of the intermediate speed gear 25, the multiple-speed gear 26 is compelled to remain in or to move to its central, neutral position. In this case this is accomplished by the forward movement of the abutments 37b and 38b against whichever of the rock arms 42 or 47 is rearward of its neutral position, while its companion is turned rearwardly to its neutral position by the gearing 40 and 45, which connects the rock shafts 41 and 44 upon which said rock arms are mounted. The centering of said primary rock arm 42 and its control rock shaft 41 causes the centering of the multiple-speed gear 26 in the same manner as described in connection with the engagement of the intermediate speed gear 25.

The high speed gear is now engaged and the operator merely releases his pressure on the clutch pedal 68, whereupon the power from the vehicle engine flows through the driving shaft 11 and high speed gear train into the driven shaft 12 and thence to the rear wheels of the vehicle. If now he pushes out said clutch pedal 68 and slows down the vehicle, the high speed gear 24 will remain in mesh if the speed of the vehicle is sufficient to warrant the use of the high speed gear ratio, i. e., if the fluid pressure of the fluid pump 121 (which is proportional to vehicle speed) is sufficiently high. If the operator slows down the vehicle below this critical speed, the check valve 127 closes, the cylindrical slide valve 105 is pushed rearwardly and the fluid passes into the forward end of the cylinder 100 and is exhausted from the rear end thereof through exhaust pipe 126. This action causes the piston rod 30 to move rearwardly and to thereby automatically engage the intermediate speed gear 25, providing the clutch is released. If the operator slows down the vehicle without depressing the clutch, then he is able to pick up speed again in high gear unless he definitely desires to use the intermediate gear in which case he moves the clutch pedal 68 forwardly thereby causing the same to be automatically effected in the manner just described.

The meshing of the intermediate gear 25 also has a critical vehicle speed and if the operator slows down the vehicle below this speed then the piston rod 30 automatically becomes neutralized by the centering springs 31. This occurs if the clutch pedal 68 is depressed as otherwise said intermediate gear is held in mesh so that the operator can pick up speed again in this intermediate gear if he desires. If not, he merely depresses said clutch pedal and the intermediate and high speed gears are automatically moved to neutral position and the vehicle may be brought to a stop without any gear shifting manipulation on the part of the operator. The gear shift mechanism is now all in neutral and is all ready to repeat any of the heretofore described successive steps of operation.

From all of the foregoing description it is obvious that the operator's manipulation of this gear shifting mechanism is reduced to a very simple minimum and that the mechanism is as completely automatic as is practicable under the varying traffic conditions with which a present day vehicle has to contend. It entirely eliminates the usual gear shift lever which so awkwardly obstructs the use of the front seat of the vehicle and replaces the same by merely a two position control lever on the steering column. In all cases the gears are released automatically and in the case of the intermediate and high gears, the same are put into mesh without any actuation other than that of the clutch pedal 68. Despite these various advantages the invention comprises only simple, rugged and durable operating members which can be individually manufactured with generous working tolerances and at low cost.

I claim as my invention:

1. A gear shift associated with the motor, rear wheels and clutch of a vehicle and comprising: driving and driven shafts; a low and a reverse gear train adapted to couple said driving and driven shafts; manual means for setting either said low or reverse gear train prior to the actuation of the clutch; and means adapted to couple the desired gear train during the release movement of said clutch.

2. A gear shift associated with the motor, rear wheels and clutch of a vehicle and comprising: driving and driven shafts; a jack shaft driven by said driving shaft; transmission gears of different pitch diameters driven by said jack shaft; a multiple-speed gear splined on said driven shaft; a shift block adapted to longitudinally shift said speed gear into engagement with the desired one of said transmission gears; a control shaft operatively connected with said shift block; a shifting segment mounted on said control shaft having a rocking notch; a shifting ring having a shifting jaw and actuated by the vehicle clutch; and means for laterally shifting said shifting ring and align its shifting jaw with the rocking notch of said shifting segment.

3. A gear shift associated with the motor, rear wheels and clutch of a vehicle and comprising: driving and driven shafts; a low and a reverse gear train adapted to couple said driving and driven shafts; manual means for setting either one of said gear trains prior to the release of said clutch; means adapted to effect the desired coupling during said release movement of said clutch; and means actuated by the clutch for neutralizing the manual setting means during the engaging movement of said clutch.

4. A gear shift associated with the motor, rear wheels and clutch of a vehicle and comprising: driving and driven shafts; a low and a reverse gear train adapted to couple said driving and driven shafts; manual means for setting either one of said gear trains prior to the next successive release of said clutch; means actuated by the clutch and adapted to effect the desired coupling during said next successive release movement of said clutch; and means actuated by the clutch for disengaging said coupling during the subsequent release movement of said clutch.

5. A gear shift associated with the motor, rear wheels and clutch of a vehicle and comprising: driving and driven shafts; a low and a reverse gear train adapted to couple said driving and driven shafts; manual means for setting either one of said gear trains prior to the next successive release of said clutch; means actuated by the clutch and adapted to effect the desired coupling during said next successive release movement of said clutch; means actuated by the clutch for neutralizing the manual setting means during the engaging movement of said clutch; and means also actuated by the clutch for disengaging said coupling during the subsequent release movement of said clutch.

6. A gear shift associated with the motor, rear wheels and clutch of a vehicle and comprising: driving and driven shafts; a plurality of gear trains adapted to couple said driving and driven shafts; a fluid pump connected to the rear wheels of the vehicle; a cylinder provided with a piston; transfer ducts in the opposite ends of said piston; low and high pressure inlet ducts tubularly connected with said pump; a spring loaded check valve arranged in said high pressure duct; a valve for controlling fluid flow from the respective inlet ducts into said transfer ducts; and a shift block connected with said piston and adapted to disengage the one or other of said gear trains.

7. A gear shift associated with the motor, rear wheels and clutch of a vehicle and comprising: driving and driven shafts; a plurality of gear trains adapted to couple said driving and driven shafts; a manually controlled simple shift block adapted to couple one of said gear trains and provided with a slot; a control rock shaft having a shift rock arm engaging with said slot; a compound shift block which is urged in the one or other direction in response to changes in vehicle speed and has pairs of transverse abutments and is adapted to couple another of said gear trains; a primary shift arm arranged on said control shaft having a head which is disposed between one set of said abutments; a secondary rock shaft geared to said control rock shaft; and a secondary shift arm secured to said secondary rock shaft and having a head which is disposed between another set of said abutments.

8. A gear shift associated with the motor, rear wheels and clutch of a vehicle and comprising: driving and driven shafts; a gear case having shiftable gear sets; a manually actuated shifting fork adapted to shift one set of shiftable gears; a fluid actuated shifting fork adapted to shift another set of shiftable gears; and means operatively connecting said shifting forks and adapted to center the fluid actuated shifting fork whenever the manually actuated fork is moved in either direction from its neutral position, said means also being adapted to center said manually actuated fork whenever said fluid actuated shifting fork is moved in either direction from its neutral position.

9. A gear shift associated with the motor, rear wheels and clutch of a vehicle and comprising: driving and driven shafts; a gear case having shiftable gear sets; a simple shift block adapted to shift one of said gear sets and having a transverse channel; a compound shift block having a plurality of pairs of abutments; a control rock shaft; a shift arm secured to said control rock shaft and engaging with said channel; a primary rock arm secured to said control rock shaft and disposed between one of the pairs of abutments of said compound shift block; a secondary rock shaft; and a secondary rock arm secured thereto and disposed between another pair of abutments of said compound shift block.

In testimony whereof I hereby affix my signature.

JOHN G. HANSON.